(12) United States Patent
Pai et al.

(10) Patent No.: US 8,072,495 B2
(45) Date of Patent: Dec. 6, 2011

(54) AUTOMATIC IMAGE CAPTURING SYSTEM

(75) Inventors: Tung-Hsuan Pai, Taipei (TW);
Ying-Jieh Huang, Taipei (TW);
Chih-Ping Chang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 361 days.

(21) Appl. No.: 12/434,062

(22) Filed: May 1, 2009

(65) Prior Publication Data

US 2010/0245597 A1    Sep. 30, 2010

(30) Foreign Application Priority Data

Mar. 27, 2009 (TW) .............................. 98110063 A

(51) Int. Cl.
*H04N 5/225* (2006.01)
(52) U.S. Cl. ............ 348/207.1; 348/333.02; 348/333.04; 348/333.11; 348/345; 348/346; 382/176
(58) Field of Classification Search ............. 348/333.04, 348/207.1
See application file for complete search history.

(56) References Cited

U.S. PATENT DOCUMENTS

| | | | |
|---|---|---|---|
| 6,301,440 B1 * | 10/2001 | Bolle et al. ..................... | 396/128 |
| 2003/0113015 A1 * | 6/2003 | Tanaka ........................... | 382/176 |
| 2003/0163623 A1 * | 8/2003 | Yeung ............................ | 710/300 |
| 2005/0271284 A1 * | 12/2005 | Chen et al. ..................... | 382/233 |
| 2006/0088214 A1 * | 4/2006 | Handley et al. ................ | 382/176 |
| 2008/0151099 A1 * | 6/2008 | Lin et al. ........................ | 348/376 |
| 2009/0167889 A1 * | 7/2009 | Onodera et al. ............ | 348/222.1 |
| 2010/0026872 A1 * | 2/2010 | Jiang ......................... | 348/333.03 |

* cited by examiner

*Primary Examiner* — Sinh Tran
*Assistant Examiner* — Paul Berardesca
(74) *Attorney, Agent, or Firm* — Kirton & McConkie; Evan R. Witt

(57) ABSTRACT

An automatic image capturing system includes a computer, an image capturing device, a monitor and an automatic image capturing program. The automatic image capturing program is installed in the computer. The image capturing device is used for capturing an image of a target object. The monitor is used for displaying shooting area. If a pre-shot image of the target object is moved to be within the shooting area, the automatic image capturing program will automatically capture the image of the target object.

15 Claims, 6 Drawing Sheets

AUTOMATIC IMAGE CAPTURING SYSTEM

FIELD OF THE INVENTION

The present invention relates to an automatic image capturing system, and more particularly to an automatic image capturing system using a web camera to capture an image of a document.

BACKGROUND OF THE INVENTION

With rapid development of electronic and information industries, image capturing devices become essential electronic devices in our daily lives. Image capturing devices are usually used to take photographs or record video data. In addition, image capturing devices are also applied to web cameras for holding a video conference. Recently, the notebook computer is usually equipped with a built-in image capturing device or the desktop computer is connected with an image capturing device.

With increasing development of digital techniques, text documents are gradually created as electronic files. Generally, text documents are scanned by scanning apparatuses and then saved as electronic files such as PDF (Portable Document Format) files. In a case that no scanning apparatus is communicated with the notebook computer, the images of simple documents such as single-sided papers or business cards may be captured by the built-in image capturing device. The images captured by the built-in image capturing device are usually saved as JPEG (Joint Photographic Experts Group) files. Most users prefer using scanning apparatuses to scan the text documents as PDF files because the texts and signs contained in the PDF files are readable by the computer systems and may be converted into editable text files As known, optical character recognition (OCR) is a process of capturing an image of a document and then extracting the texts from that image. It is possible to analyze images that are captured from the image capturing device according to the OCR technique and saved as JPEG files. As a consequence, individual texts or signs contained in the JPEG files are recognized and converted as editable text files. Since the associated OCR techniques are well established, the image capturing device is gradually adopted to obtain electronic files of the documents.

When an image capturing device is used to capture the image of a document, some difficulties possibly occur. For example, it is critical to hold the document steady. Generally, the focal length of a web camera (image capturing device) of the commercially available computer is set to be approximately 60 centimeters. Such a focal length is suitable to capture the image of the user's facial expression rather than the document. For capturing the image of an article contained in the document by the image capturing device, the document needs to be moved to the focusing position of the image capturing device. If this document is held by the user's hand, the document is readily rocked due to the long holding time. Under this circumstance, the obtained document image is usually blurred. For preventing from rocking of the document and thus obtaining a sharp document image, a static document stand is used for holding the document steady. The use of the document stand and the predetermined focusing position of the image capturing device, however, incur other problems. In a case that the document stand is used in other places, the user should carry the notebook computer and the document stand at the same time, which is very troublesome to the user.

For convenience, the document is directly placed on a working plane (e.g. a desk plane) without the need of the document stand. After the document is placed on a proper location of the working plane, the upper cover of the notebook computer is rotated such that the image capturing device is aligned with or close to the document. Meanwhile, the image of the document may be captured by the image capturing device. When the image capturing device of the notebook computer is used to capture the image of the document placed on the working plane, some drawbacks also occur. The common drawback is occurrence of a distorted image. If the shooting range of the image capturing device is insufficient, the image captured by the image capturing device for a single time is usually incomplete. For solving this drawback, the user usually takes photographs of the document for two times in order to obtain two incomplete images. By means of image processing techniques, these two incomplete images are combined together. In other words, after the upper-half portion of the document is captured by the image capturing device, the document should be moved such that the lens of the image capturing device is aligned with the lower-half portion of the document and the image of the lower-half portion is captured. Since there is no reliable reference tool or reference point on the document, the document is readily aslant during movement of the document. Consequently, the document posterior to movement fails to be parallel with the original location of the document. Under this circumstance, the image of the lower-half portion of the document is distorted and is unsuccessfully combined with the upper-half portion of the document. For obtaining a sharp image, it is necessary to re-capture the document. In other words, the distorted image is troublesome to the user.

SUMMARY OF THE INVENTION

It is an object of the present invention to provide an easy-to-use automatic image capturing system.

Another object of the present invention provides an automatic image capturing system for quickly capturing an image of a document.

In accordance with an aspect of the present invention, there is provided an automatic image capturing system. The automatic image capturing system includes an image capturing device, a monitor and an automatic image capturing program. The image capturing device is used for focus-shooting a target object. The monitor is used for displaying a pre-shot image, wherein the pre-shot image includes a pre-shot object image. The automatic image capturing program is used for performing a pre-shooting operation on the target object within a first focusing range such that a shooting area and the pre-shot image are displayed on a display zone of the monitor, and discriminating whether a focus-shooting operation is performed according to a relationship between the pre-shot image and the shooting area. If a portion of the pre-shot object image is beyond the shooting area, the automatic image capturing program generates a prompt message. Whereas, if the pre-shot object image is located within the shooting area, the automatic image capturing program generates a shooting signal. In response to the shooting signal, the image capturing device performs the focus-shooting operation on the target object to obtain an object image.

In an embodiment, a user interface is shown on the monitor after the automatic image capturing program is activated. According to a setting via the user interface, the image capturing device is permitted to perform the pre-shooting operation when the target object is located within the first focusing range or a second focusing range.

In an embodiment, the distance between the first focusing range and the image capturing device is shorter than the distance between the second focusing range and the image capturing device.

In an embodiment, the user interface comprises several target object type selective items. A specified focusing range is set by clicking one of the target object type selective items. The image capturing device is permitted to perform the pre-shooting operation when the target object is located within the specified focusing range.

In an embodiment, the user interface further includes a snapshot selective item, and the image capturing device captures an image when the snapshot selective item is clicked.

In an embodiment, the target object is a business card, and the image capturing device is permitted to perform the pre-shooting operation when the target object is located within the first focusing range.

In an embodiment, the target object is an A4-sized document, and the image capturing device is permitted to perform the pre-shooting operation when the target object is located within the second focusing range.

In an embodiment, if the pre-shot object image is located within the shooting area and the automatic image capturing program discriminates that texts or pictures are included in the pre-shot object image, the image capturing device performs the focus-shooting operation on the target object. Whereas, if the pre-shot object image is located within the shooting area but the automatic image capturing program discriminates that no texts or pictures are included in the pre-shot object image, the automatic image capturing program issues an error message.

In an embodiment, if the pre-shot object image is located within the shooting area, the amount of high-frequency data included in the pre-shot object image is calculated to discriminate whether texts or pictures are included in the pre-shot object image.

In an embodiment, if the amount of high-frequency data included in the pre-shot object image is larger than or equal to a high-frequency data threshold value, the automatic image capturing program discriminates that the pre-shot object image contains texts or pictures. Whereas, if the amount of high-frequency data included in the pre-shot object image is smaller than a high-frequency data threshold value, the automatic image capturing program discriminates that the pre-shot object image contains no texts or pictures and issues an error message.

In an embodiment, the prompt message and the error message are displayed by a dialog box that is shown on the display zone.

In an embodiment, the automatic image capturing system further includes an audio output device for outputting audio signals.

In an embodiment, the prompt message and the error message are outputted from the audio output device as the audio signals.

In an embodiment, the prompt notifies a moving direction of the target object, and the target object is moved in the moving direction such that the pre-shot object image is located within the shooting area.

In an embodiment, the automatic image capturing system further includes a computer, which has a memory for storing the object image.

In an embodiment, the monitor and the image capturing device are connected with the computer, and the image capturing device is a web camera.

In an embodiment, the automatic image capturing system further includes an optical character recognition (OCR) program for analyzing multiple image data contained in the object image and saving the image data in a document file.

In an embodiment, the image data including a symbol "@" is saved in an electronic mailbox column of the document file.

In an embodiment, the image data including a symbol "Tel" is saved in a telephone number column of the document file.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For obviating the drawbacks encountered from the prior art, the present invention provides an automatic image capturing system for capturing an image of a sheet-like document.

Figure 1:
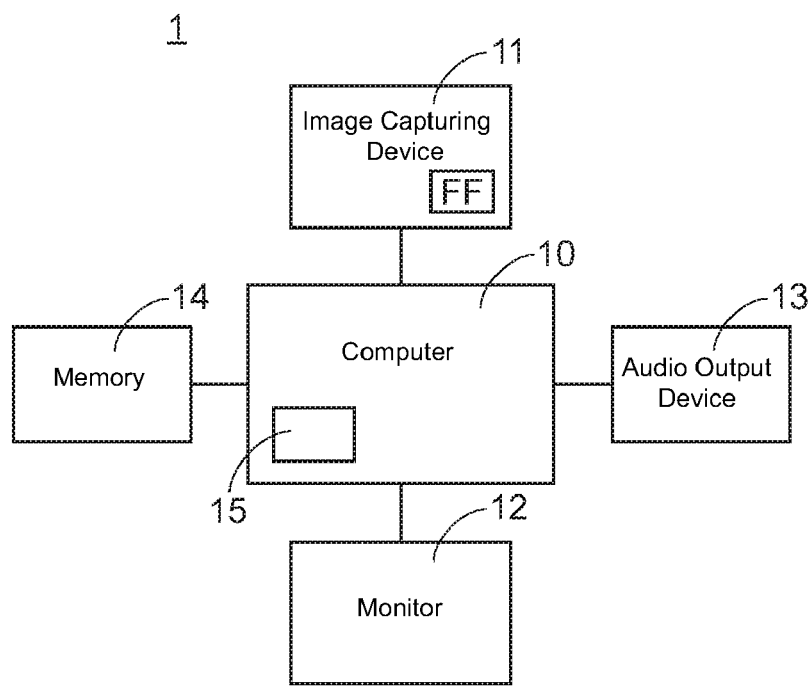
FIG. 1 is a schematic functional block diagram illustrating an automatic image capturing system according to a first embodiment of the present invention.

FIG. 1 is a schematic functional block diagram illustrating an automatic image capturing system according to a first embodiment of the present invention. As shown in FIG. 1, the automatic image capturing system 1 comprises a computer 10, an image capturing device 11, a monitor 12, an audio output device 13, a memory 14 and an automatic image capturing program 15. An example of the computer 10 includes but is not limited a desktop computer or a notebook computer. The image capturing device 11, the monitor 12 and the audio output device 13 are electrically connected with the computer 10. In an embodiment, the image capturing device 11 is a web camera with a constant focal length in order to perform a focus-shooting operation on a target object. The monitor 12 has a display zone 121 (see FIG. 3) for displaying a pre-shot image or an object image. The audio output device 13 is used for outputting audio signals. The memory 14 is disposed within the computer 10 for storing the image shot by the image capturing device 11. The automatic image capturing program 15 has been previously installed in the computer 10. In a case that an object enters the shooting range of the image capturing device 11, the automatic image capturing program 15 will decide whether a pre-shooting operation or a focus-shooting operation is done. In this embodiment, the target object to be captured by the automatic image capturing system 1 is a business card. The constant focal length of the image capturing device 11 is set to be the focal length of the business card. The focal length of the business card falls into a first focusing range F1 (see FIG. 2).

Figure 2:
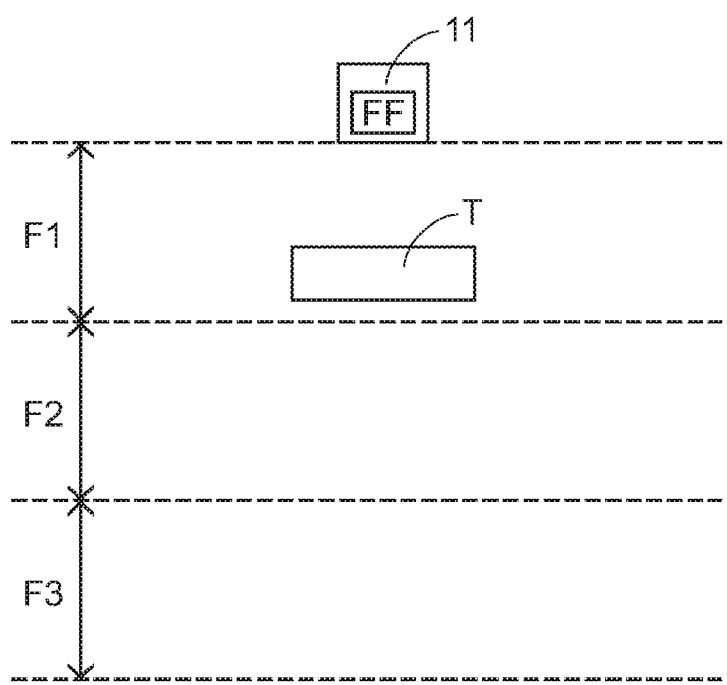
FIG. 2 is a schematic view illustrating the use of the automatic image capturing system to capture an object within the first focusing range F1 according to the first embodiment of the present invention.
Figure 3:
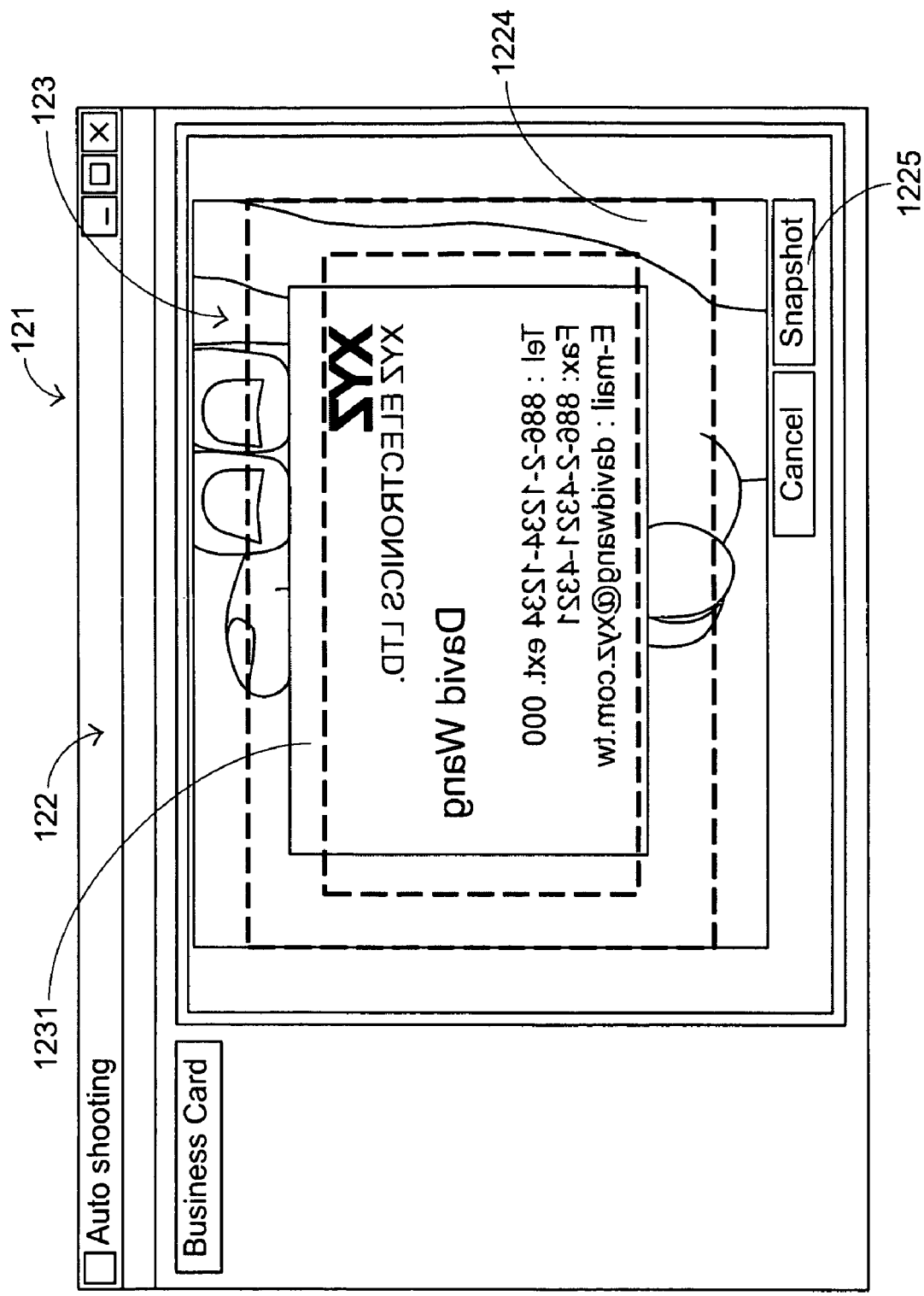
FIG. 3 is a schematic view illustrating the display zone showing a pre-shot image according to the first embodiment of the present invention.

FIG. 2 is a schematic view illustrating the use of the automatic image capturing system to capture an object within the first focusing range F1 according to the first embodiment of the present invention. FIG. 3 is a schematic view illustrating the display zone showing a pre-shot image according to the first embodiment of the present invention. Hereinafter, the operations of the automatic image capturing system 1 will be illustrated in more details with reference to FIGS. 1, 2 and 3. First of all, the automatic image capturing program 15 is activated. Then, the target object T is placed within the first focusing range F1 (see FIG. 2). After the automatic image capturing program 15 is activated, a user interface 122 is shown on the display zone 121 of the monitor 12 (see FIG. 3). On the other hand, after the automatic image capturing program 15 is activated, the image capturing device 11 will perform a pre-shooting operation on the target object T that is placed within the first focusing range F1.

In the first embodiment of the present invention, the image capturing device 11 can only be focused on the focusing position within the first focusing range Fl because the focal length of the image capturing device 11 is constant. Since the target object T (e.g. a business card) usually fails to be placed at the focusing position, the user interface 122 created by the automatic image capturing program 15 can facilitate the user to move the target object T to the focusing position by hand. In FIG. 3, the user interface 122 is shown on the display zone 121 of the monitor 12. Via the user interface 122, a pre-shot image 123 and a shooting area 1224 are shown on the display zone 121. The pre-shot image 123 includes a pre-shot object image 1231.

During the image capturing device 11 pre-shoots the image of the target object T held by the user's hand, the user may move the target object T according to the position of the pre-shot object image 1231 relative to the shooting area 1224. As a consequence, the pre-shot object image 1231 is moved to be within the shooting area 1224. If any portion of the pre-shot object image 1231 is beyond the shooting area 1224, the automatic image capturing program 15 generates a prompt message to notify the user of the accurate moving direction. For example, if the right edge of the pre-shot object image 1231 is beyond the shooting area 1224, the automatic image capturing program 15 generates a prompt message to notify the user that the target object T needs to be moved in the left direction. According to the prompt message, the user will realize which direction the target object T needs to be moved to. In an embodiment, a dialog box is created on the display zone 121 to show the prompt message. In another embodiment, the prompt message is an audio signal that is outputted through the audio output device 13.

On the other hand, if the pre-shot object image 1231 is located within the shooting area 1224, the automatic image capturing program 15 can further discriminate whether the target object T contains texts or pictures and then decide whether the focus-shooting operation is performed. According to the imaging characteristics, texts or pictures could be deemed as high-frequency data. By calculating the amount of high-frequency data included in the pre-shot object image 1231, the automatic image capturing program 15 can realize whether texts or pictures are included in the pre-shot object image 1231. By undue experiments, a high-frequency data threshold value is obtained and the high-frequency data threshold value is stored in the automatic image capturing program 15. If the amount of high-frequency data included in the pre-shot object image 1231 is smaller than the high-frequency data threshold value, the automatic image capturing program 15 will discriminate that the target object T contains no texts or pictures. Meanwhile, an error message is issued to notify the user that the focus-shooting operation is not suitably performed on the target object T. Like the prompt message, the error message could be shown in a dialog box or outputted through the audio output device 13 as an audio signal. On the other hand, if the amount of high-frequency data included in the pre-shot object image 1231 is larger than or equal to the high-frequency data threshold value, the automatic image capturing program 15 will discriminate that the target object T contains texts or pictures. Meanwhile, a shooting signal is generated. In response to the shooting signal, the image capturing device will focus-shoot the image of the target object T so as to obtain an object image. The object image is then stored in the memory 14.

After the object image is obtained, the automatic image capturing system 1 will analyze multiple image data contained in the object image according to an optical character recognition (OCR) technology and save the image data in a document file. Take a business card for example. The image data including a symbol "@" will be saved in the electronic mailbox column of the document file. In addition, the image data including a symbol "Tel" will be saved in the telephone number column of the document file. By using the automatic image capturing system 1 to perform a focus-shooting operation on the business card, the information associated with the business card could be retrieved by the computer without the need of manually inputting the information of the business card one by one.

Please refer to FIG. 3 again. For providing more functions, the user interface 122 further includes a snapshot selective item 1225. By clicking the snapshot selective item 1225, the automatic image capturing program 15 generates a shooting signal. In response to the shooting signal, the image capturing device 11 will shoot the image of the target object T so as to obtain an object image. In other words, when the snapshot selective item 1225 is clicked, the image of the target object T is captured by the image capturing device 11 under the user's control.

In the first embodiment, the present invention is illustrated by referring to an automatic image capturing system capable of capturing a specified size of document (e.g. a business card). Nevertheless, the automatic image capturing system can be used to capture various sizes of documents.

Figure 4:
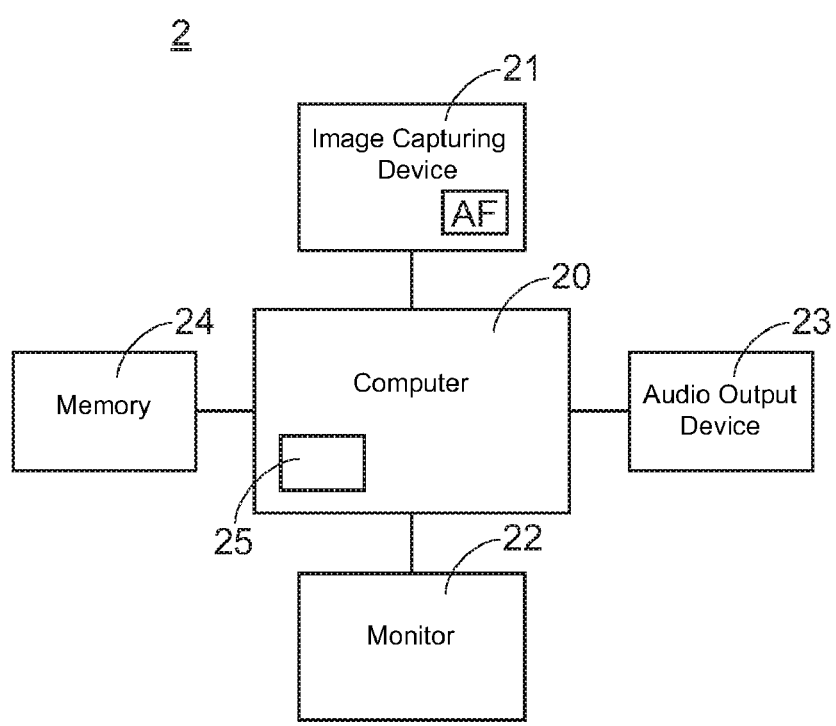
FIG. 4 is a schematic functional block diagram illustrating an automatic image capturing system according to a second embodiment of the present invention.

FIG. 4 is a schematic functional block diagram illustrating an automatic image capturing system according to a second embodiment of the present invention. As shown in FIG. 4, the automatic image capturing system 2 comprises a computer 20, an image capturing device 21, a monitor 22, an audio output device 23, a memory 24 and an automatic image capturing program 25. The operation principles of the computer 20, the monitor 22, the audio output device 23 and the memory 24 are similar to those illustrated in the first embodiment, and are not redundantly described herein. In contrast, the image capturing device 21 is a web camera having an auto focus function. In addition, the function of the automatic image capturing program 25 is somewhat different from that of the automatic image capturing program 15.

Figure 5:
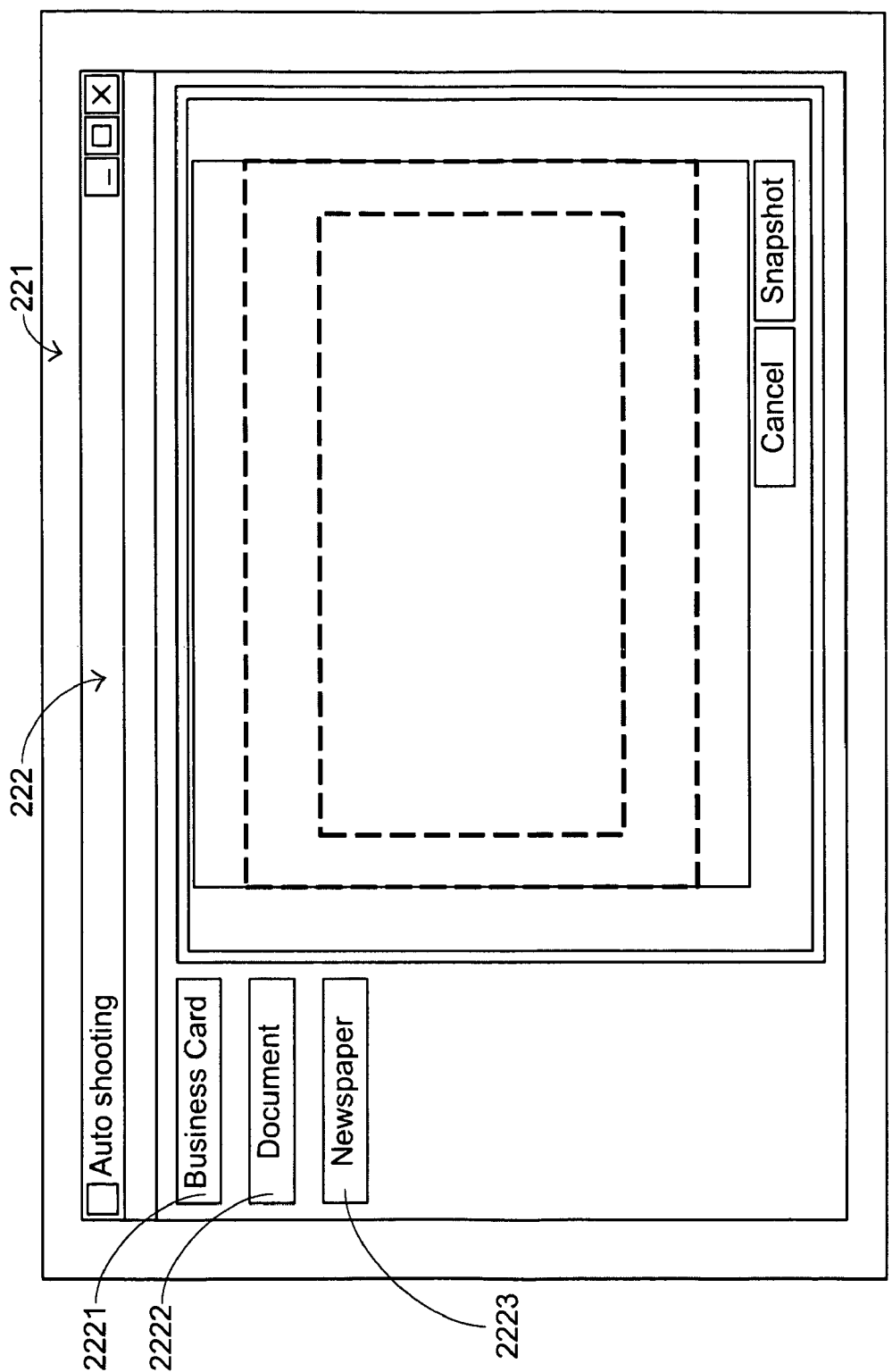
FIG. 5 is a schematic view illustrating the display zone after the automatic image capturing program is activated according to the second embodiment of the present invention.

Hereinafter, the operations of the automatic image capturing system 2 will be illustrated with reference to FIGS. 4 and 5. FIG. 5 is a schematic view illustrating the display zone after the automatic image capturing program is activated according to the second embodiment of the present invention. After the automatic image capturing program 25 is activated, a user interface 222 is shown on the display zone 221 of the monitor 22. The user interface 222 comprises several target object type selective items, including a business card selective item 2221, an ordinary document selective item 2222 and a newspaper selective item 2223. By clicking the business card selective item 2221, the ordinary document selective item 2222 or the newspaper selective item 2223, the target object to be captured by the image capturing device 21 is set to be a business card, an ordinary document or a newspaper, respectively. The ordinary document is an A4-sized document having a dimension of 297 mm×210 mm. It is of course that the target object type selective items may be altered according to practical requirements.

Via the user interface 222, the user can select a proper target object type from the target object type selective items. In addition, since a desired focusing range is quickly selected via the user interface 222, the time period required for obtaining correct focus by the image capturing device 21 is reduced. In accordance with the present invention, the image capturing device 21 of the automatic image capturing system 2 has multiple focusing ranges in order to comply with different sizes of various target objects. Via the user interface 222, the user can select a proper target object type and thus a desired focusing range is decided. Under this circumstance, the time period required for obtaining correct focus is reduced.

Please refer to FIG. 5 again. After the automatic image capturing program 25 is activated, a user interface 222 is shown on the display zone 221 of the monitor 22. Once the business card selective item 2221 is selected, the automatic image capturing program 25 allows the image capturing device 21 to perform the pre-shooting operation on the target object (e.g. a business card) when the target object is located within the first focusing range F1. Once the ordinary document selective item 2222 is selected, the automatic image capturing program 25 allows the image capturing device 21 to perform the pre-shooting operation on the target object (e.g. an A4-document) when the target object is located within a second focusing range F2 (see FIG. 6). Once the newspaper selective item 2223 is selected, the automatic image capturing program 25 allows the image capturing device 21 to perform the pre-shooting operation on the target object (e.g. a newspaper) when the target object is located within a third focusing range F3. The distance between the first focusing range F1 and the image capturing device 21 is shorter than the distance between the second focusing range F2 and the image capturing device 21. The distance between the second focusing range F2 and the image capturing device 21 is shorter than the distance between the third focusing range F3 and the image capturing device 21. That is, the first focusing range F1 is the closest to the image capturing device 21, the second focusing range F2 is secondly closest to the image capturing device 21, and the third focusing range F3 is the farther from the image capturing device 21.

Figure 6:
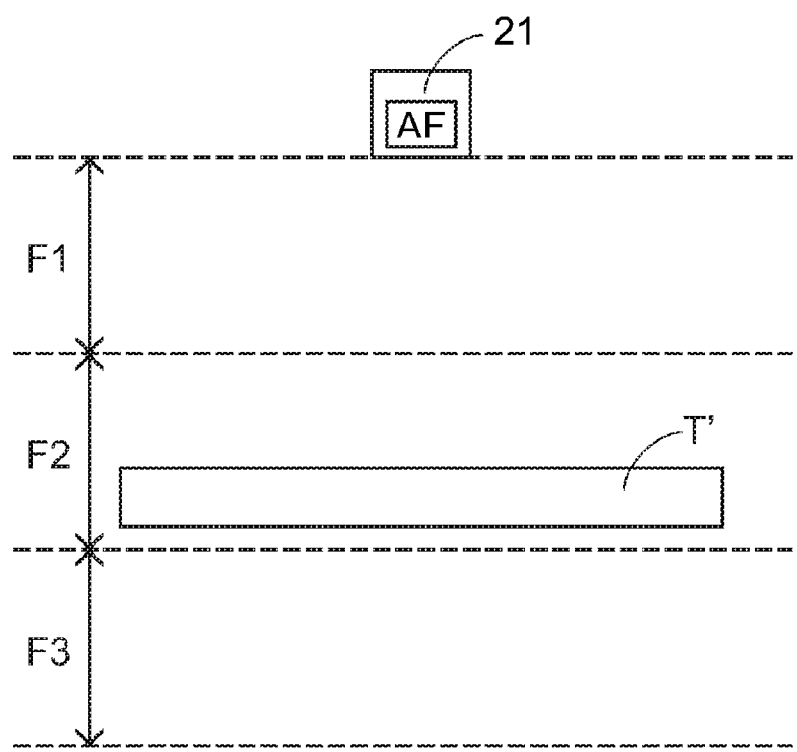
FIG. 6 is a schematic view illustrating the use of the automatic image capturing system to capture an object within the second focusing range F2 according to the second embodiment of the present invention.

FIG. 6 is a schematic view illustrating the use of the automatic image capturing system to capture an object within the second focusing range F2 according to the second embodiment of the present invention. Please refer to FIGS. 5 and 6. If the ordinary document selective item 2222 is selected, the image capturing device 21 will perform a pre-shooting operation on the target object T' when the target object T' is moved to be within the second focusing range F2.

Figure 7:
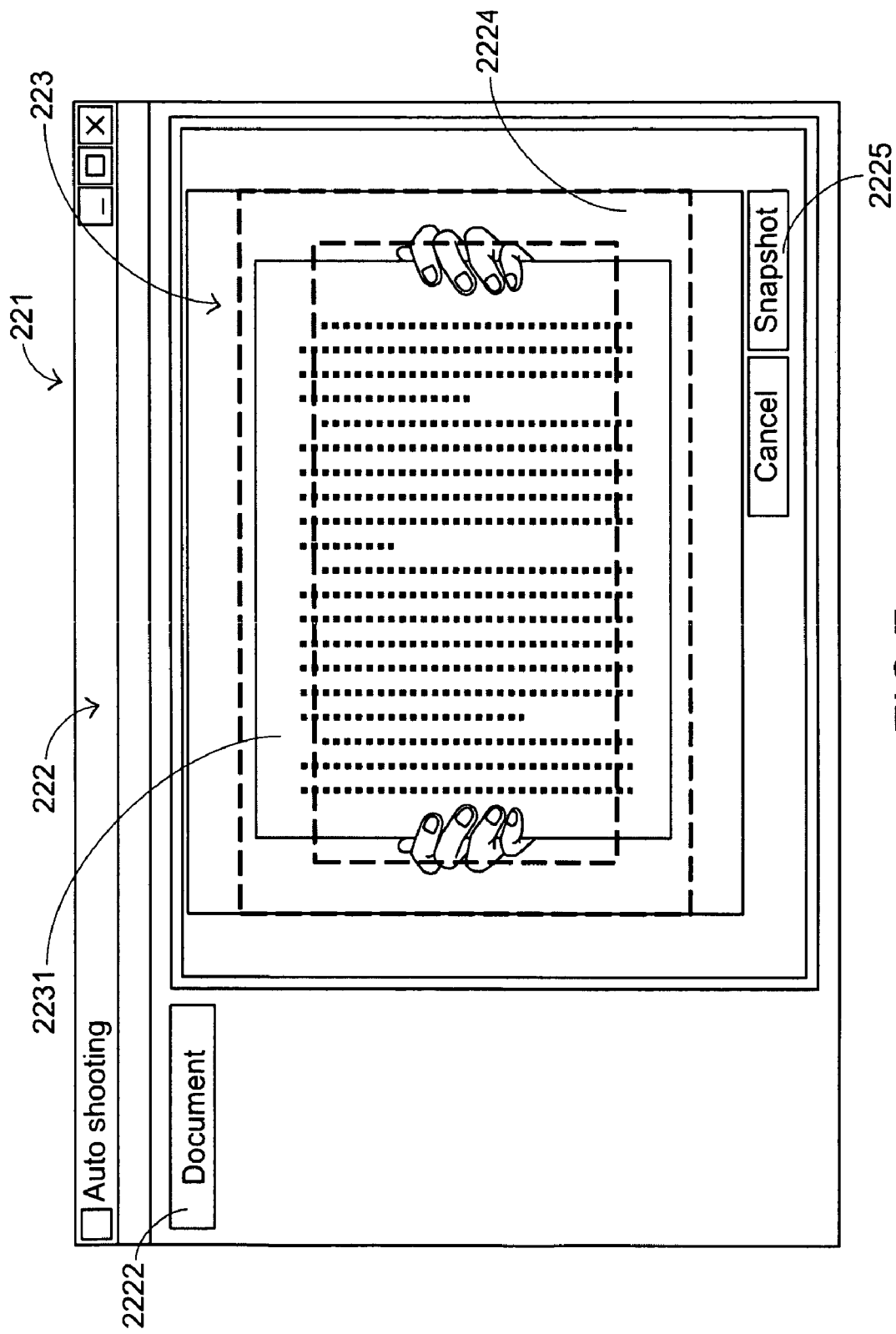
FIG. 7 is a schematic view illustrating the display zone showing a pre-shot image according to the second embodiment of the present invention.

FIG. 7 is a schematic view illustrating the display zone showing a pre-shot image according to the second embodiment of the present invention. When the target object T' is moved to be within the second focusing range F2, the image capturing device 21 executes an auto focus function and performs a pre-shooting operation on the target object T'. As such, a pre-shot image 223 and a shooting area 2224 are shown on the display zone 221 via the user interface 222. The pre-shot image 223 includes a pre-shot object image 2231.

During the image capturing device 21 executes the auto focus function and performs the pre-shooting operation on the target object T' that is held by the user's hand, the user may move the target object T' according to the position of the pre-shot object image 2231 relative to the shooting area 2224. As a consequence, the pre-shot object image 2231 is moved to be within the shooting area 2224. If any portion of the pre-shot object image 2231 is beyond the shooting area 2224, the automatic image capturing program 25 generates a prompt message to notify the user of the accurate moving direction. The generation and content of the prompt message are similar to those illustrated in the first embodiment, and are not redundantly described herein.

On the other hand, if the pre-shot object image 2231 is located within the shooting area 2224, the automatic image capturing program 25 can further discriminate whether the target object T' contains texts or pictures and then decide whether the focus-shooting operation is performed. By calculating the amount of high-frequency data included in the pre-shot object image 2231, the automatic image capturing program 25 can realize whether texts or pictures are included in the pre-shot object image 2231. If the amount of high-frequency data included in the pre-shot object image 2231 is smaller than the high-frequency data threshold value, the automatic image capturing program 25 will discriminate that the target object T' contains no texts or pictures. Meanwhile, an error message is issued to notify the user that the focus-shooting operation is not suitably performed on the target object T'. On the other hand, if the amount of high-frequency data included in the pre-shot object image 2231 is larger than or equal to the high-frequency data threshold value, the automatic image capturing program 25 will discriminate that the target object T' contains texts or pictures. Meanwhile, a shooting signal is generated. In response to the shooting signal, the image capturing device will focus-shoot the image of the target object T' so as to obtain an object image. The object image is then stored in the memory 24. The generation and content of the error message are similar to those illustrated in the first embodiment, and are not redundantly described herein. After the object image is obtained, the automatic image capturing system 2 will analyze multiple image data contained in the object image according to an optical character recognition (OCR) technology and save the image data in a document file. The image analyzing procedure is similar to that illustrated in the first embodiment, and is not redundantly described herein.

From the above description, the automatic image capturing system of the present invention defines several focusing ranges of the image capturing device. By selecting one of the focusing ranges, the image capturing device performs a pre-shooting operation on the target object within a selected focusing range. According to a relationship between the pre-shot image and a shooting area shown on the display zone of the monitor, the target object is moved such that the pre-shot image is located within the shooting area. When the pre-shot image is located within the shooting area, the image capturing device performs a focus-shooting operation on the target object to obtain an object image. Since a desired focusing range is selected according to the automatic image capturing system of the present invention, when compared with the conventional global search technology, the time period required for obtaining correct focus is reduced and the possibility of causing the internal components of the image capturing device to collide with each other is minimized. Moreover, since the shooting area could be deemed as a virtual document stand, the user needs not to take a physical document stand to hold the document. It is of course that the use of the physical document stand is also feasible. Since the automatic image capturing system of the present invention can capture the image of different type of documents or a specified type of document according to the practical requirements (e.g. cost-effectiveness or time-saving purpose), the utilization flexibility of the automatic image capturing system is enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An automatic image capturing system comprising:
   an image capturing device for focus-shooting a target object;
   a monitor for displaying a pre-shot image, wherein said pre-shot image includes a pre-shot object image; and
   an automatic image capturing program for performing a pre-shooting operation on said target object within a first focusing range such that a shooting area and said pre-shot image are displayed on a display zone of said monitor, and discriminating whether a focus-shooting operation is performed according to a relationship between said pre-shot image and said shooting area, wherein if a portion of said pre-shot object image is beyond said shooting area, said automatic image capturing program generates a prompt message, and if said pre-shot object image is located within said shooting area, said automatic image capturing program generates a shooting signal, and in response to said shooting signal, said image capturing device performs said focus-shooting operation on said target object to obtain an object image;
   wherein if said pre-shot object image is located within said shooting area and said automatic image capturing program discriminates that texts or pictures are included in said pre-shot object image, said image capturing device performs said focus-shooting operation on said target object, and if said pre-shot object image is located within said shooting area but said automatic image capturing program discriminates that no texts or pictures are included in said pre-shot object image, said automatic image capturing program issues an error message;
   wherein if said pre-shot object image is located within said shooting area, the amount of high-frequency data included in the pre-shot object image is calculated to discriminate whether texts or pictures are included in said pre-shot object image;
   wherein if the amount of high-frequency data included in said pre-shot object image is larger than or equal to a high-frequency data threshold value, said automatic image capturing program discriminates that said pre-shot object image contains texts or pictures, and if the amount of high-frequency data included in said pre-shot object image is smaller than a high-frequency data threshold value, said automatic image capturing program discriminates that said pre-shot object image contains no texts or pictures and issues said error message;
   wherein said prompt message and said error message are displayed by a dialog box that is shown on said display zone.

2. The automatic image capturing system according to claim 1 wherein a user interface is shown on said monitor after said automatic image capturing program is activated, and according to a setting via said user interface, said image capturing device is permitted to perform said pre-shooting operation when said target object is located within said first focusing range or a second focusing range.

3. The automatic image capturing system according to claim 2 wherein the distance between said first focusing range and said image capturing device is shorter than the distance between said second focusing range and said image capturing device.

4. The automatic image capturing system according to claim 2 wherein said user interface comprises several target object type selective items, a specified focusing range is set by clicking one of said target object type selective items, and said image capturing device is permitted to perform said pre-shooting operation when said target object is located within said specified focusing range.

5. The automatic image capturing system according to claim 2 wherein said user interface further includes a snapshot selective item, and said image capturing device captures an image when said snapshot selective item is clicked.

6. The automatic image capturing system according to claim 2 wherein said target object is a business card, and said image capturing device is permitted to perform said pre-shooting operation when said target object is located within said first focusing range.

7. The automatic image capturing system according to claim 2 wherein said target object is an A4-sized document, and said image capturing device is permitted to perform said pre-shooting operation when said target object is located within said second focusing range.

8. The automatic image capturing system according to claim 1 further comprising an audio output device for outputting audio signals.

9. The automatic image capturing system according to claim 1 wherein said prompt notifies a moving direction of said target object, and said target object is moved in said moving direction such that said pre-shot object image is located within said shooting area.

10. The automatic image capturing system according to claim 1 further comprising a computer, wherein said computer has a memory for storing said object image.

11. The automatic image capturing system according to claim 10 wherein said monitor and said image capturing device are connected with said computer, and said image capturing device is a web camera.

12. The automatic image capturing system according to claim 1 further comprising an optical character recognition (OCR) program for analyzing multiple image data contained in said object image and saving said image data in a document file.

13. The automatic image capturing system according to claim 12 wherein said image data including a symbol "@" is saved in an electronic mailbox column of said document file.

14. The automatic image capturing system according to claim 12 wherein said image data including a symbol "Tel" is saved in a telephone number column of the document file.

15. An automatic image capturing system comprising:
   an image capturing device for focus-shooting a target object;
   a monitor for displaying a pre-shot image, wherein said pre-shot image includes a pre-shot object image;

an automatic image capturing program for performing a pre-shooting operation on said target object within a first focusing range such that a shooting area and said pre-shot image are displayed on a display zone of said monitor, and discriminating whether a focus-shooting operation is performed according to a relationship between said pre-shot image and said shooting area, wherein if a portion of said pre-shot object image is beyond said shooting area, said automatic image capturing program generates a prompt message, and if said pre-shot object image is located within said shooting area, said automatic image capturing program generates a shooting signal, and in response to said shooting signal, said image capturing device performs said focus-shooting operation on said target object to obtain an object image; and an audio output device for outputting audio signals;

wherein if said pre-shot object image is located within said shooting area and said automatic image capturing program discriminates that texts or pictures are included in said pre-shot object image, said image capturing device performs said focus-shooting operation on said target object, and if said pre-shot object image is located within said shooting area but said automatic image capturing program discriminates that no texts or pictures are included in said pre-shot object image, said automatic image capturing program issues an error message;

wherein if said pre-shot object image is located within said shooting area, the amount of high-frequency data included in the pre-shot object image is calculated to discriminate whether texts or pictures are included in said pre-shot object image;

wherein if the amount of high-frequency data included in said pre-shot object image is larger than or equal to a high-frequency data threshold value, said automatic image capturing program discriminates that said pre-shot object image contains texts or pictures, and if the amount of high-frequency data included in said pre-shot object image is smaller than a high-frequency data threshold value, said automatic image capturing program discriminates that said pre-shot object image contains no texts or pictures and issues said error message;

wherein said prompt message and said error message are outputted from said audio output device as said audio signals.

* * * * *